Dec. 21, 1954
R. W. FYKE
2,697,394
DISK PLOW
Filed July 28, 1949
3 Sheets-Sheet 1
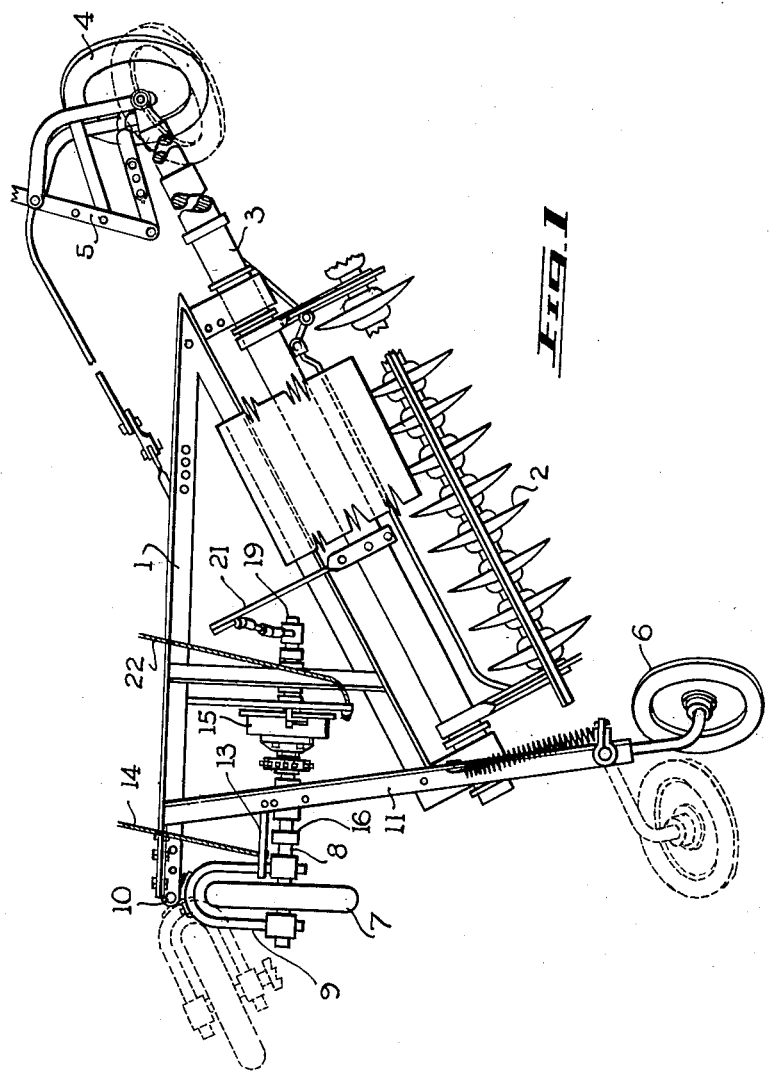
Inventor
RUSSELL W. FYKE
by W. Swim Crockett.
Attorney.

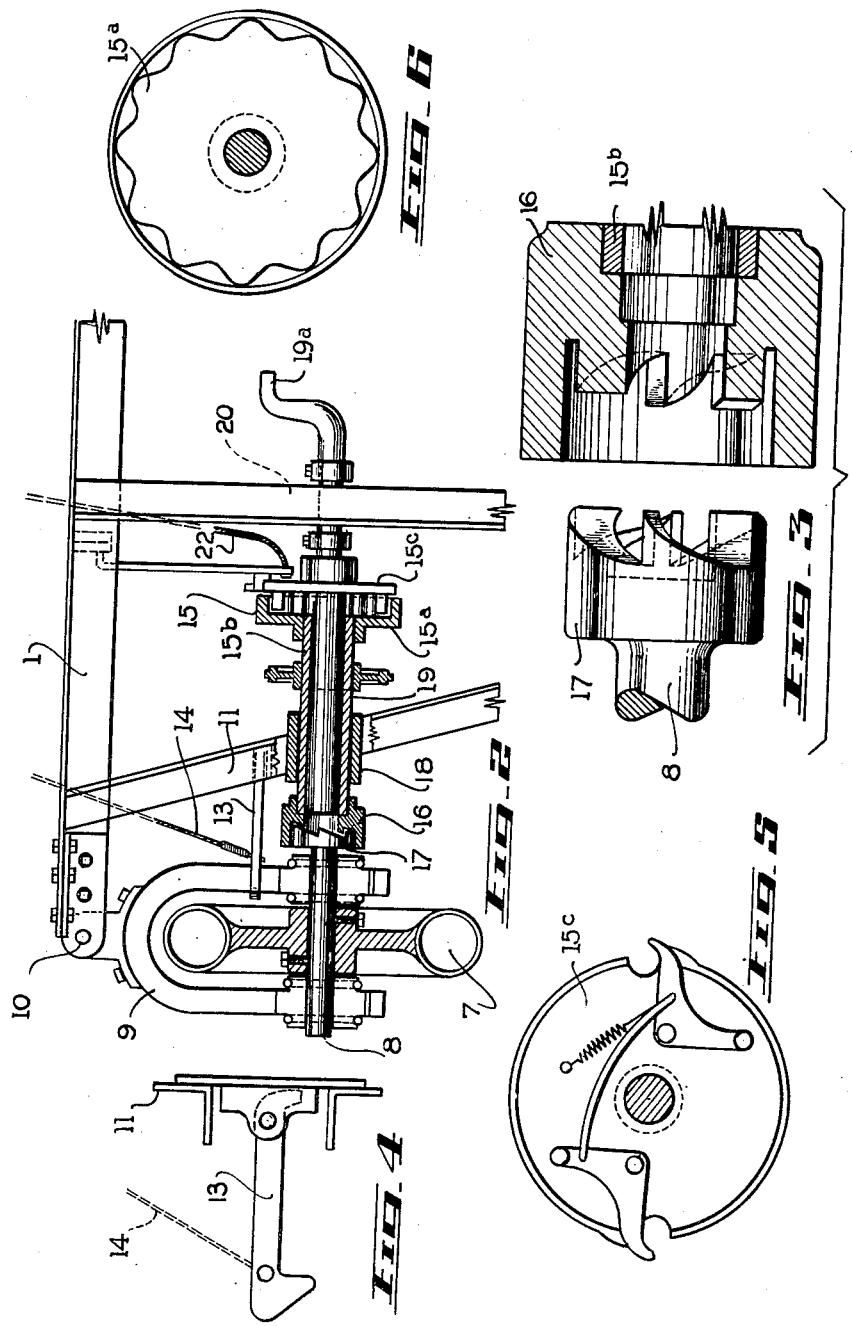

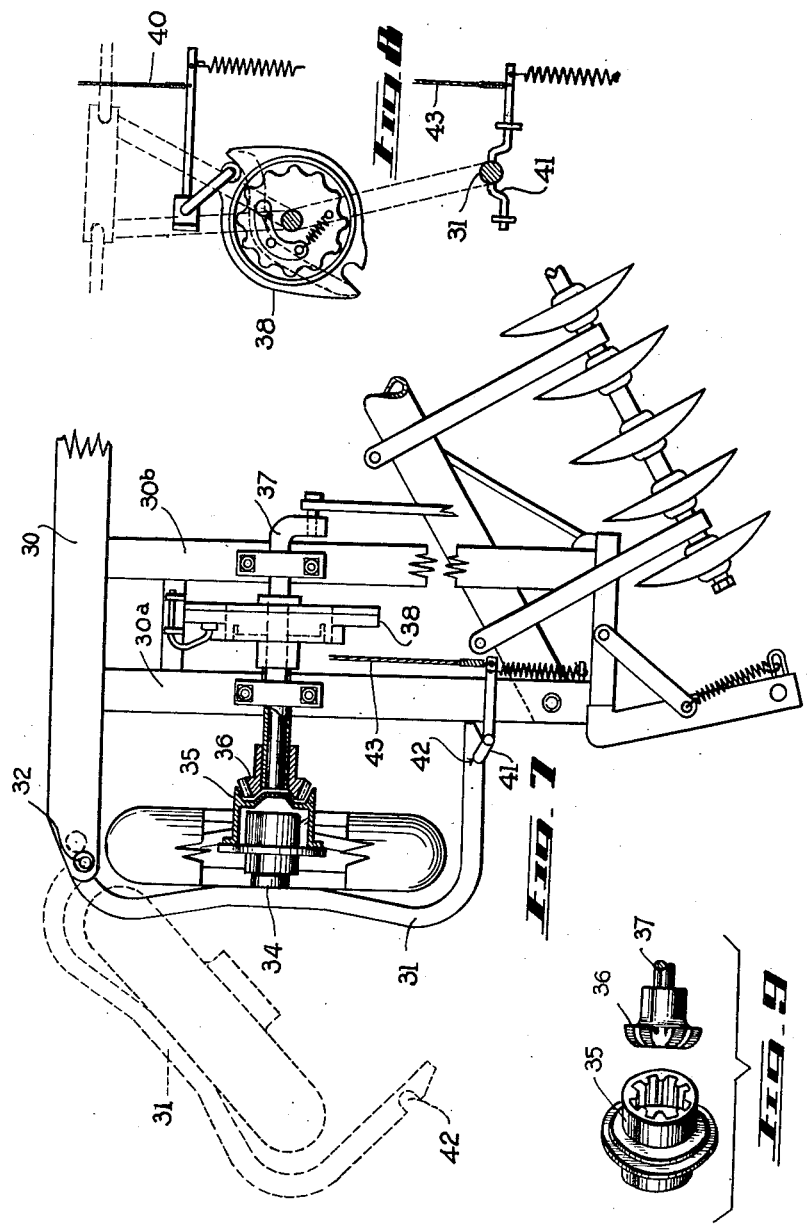

United States Patent Office 2,697,394
Patented Dec. 21, 1954

2,697,394

DISK PLOW

Russell W. Fyke, Sceptre, Saskatchewan, Canada

Application July 28, 1949, Serial No. 107,350

7 Claims. (Cl. 97—181)

My present invention relates to certain new and useful improvements in agricultural implements or the like and more particularly has regard to novel structure of frame and wheel support therefor.

An object of the invention is to provide a wide agricultural implement or the like with a wheel-carried frame capable of swinging easily from a substantially transverse working position into a relatively longitudinal road-going position.

A further object of the invention is to provide an implement, suitable for towing by a tractor, with wheel supporting structure normally causing the implement to travel in one position with respect to its line of draft and releasable by remote control to allow said implement to swing into a different position with respect to the line of draft.

A further object of the invention is to provide an agricultural implement such as a wide, one-way plow or the like with an improved frame and associated wheel supporting structure, that allows the wide machine, normally drawn in a position substantially transversely to the line of draft, to swing into a road travelling position substantially in line with the direction of draft, that it may pass freely through gateways and enable its passage along lanes or roads to be negotiated.

A further object of the invention is to provide a dirigible machine such as a wide one-way harrow or similar soil working implement with a novel wheel mount normally in fixed relation to the frame but releasable by the operator from a distant post so that it may swing freely like a trailing caster wheel and automatically returnable to original fixed position and self lockable therein.

A further object of the invention is the provision of an agricultural implement of the nature and for the purpose described having improved and novel wheel supporting structure, especially as concerns the land wheel which, while normally fixed in relation to the implement frame, may be freed to swing freely as a caster and yet may be caused to reconnect fixedly and lock automatically with the frame by the action of the implement on its being brought into soil working operation.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a plan view of an adaptation of this invention to a wide one-way disk plow;

Figure 2 is an enlarged horizontal section through the land wheel and its associated plow-lifting mechanism;

Figure 3 is an enlarged detail of the separable drive coupling between the land wheel shaft and the plow lift;

Figure 4 is an enlarged side elevation of the releasable, automatic, self-engaging latch for the land wheel's swinging frame;

Figures 5 and 6 are elevations of the confronting faces of plow power lift clutch parts;

Figure 7 is a sectional plan view of a slightly modified form of swinging land wheel frame and separable drive coupling;

Figure 8 is a schematic sectional view of the power lift clutch, showing the line operated control therefor and the position of the line operated, wheel frame latch release; and Figure 9 is a composite elevation, partly in perspective, of the cooperating parts of the separable drive coupling.

For purposes of illustration the invention is shown as applied to a wide one-way plow comprising a substantially triangular main frame 1, plow disks arranged in one or more sections 2 supported by or otherwise attached to a diagonally disposed main beam 3. Generally speaking this suitably assembled frame 1 and beam 3 are supported by a pivotally mounted front furrow wheel 4, on the forward end of the beam 3, that is controlled by a special type of steerable draft hitch 5 common on such implements; a trailing rear furrow wheel 6 that is free to swing in a vertical pivot mounting in response to the turning or steering of the whole implement; and a land wheel 7 in normally fixed position at the forward end of the implement on the side opposite said front furrow wheel 4. When being drawn by a tractor, the set of the front furrow wheel by proper adjustment of the steering draft hitch 5 and the fixed position of the land wheel 7 operate against the thrust of the soil engaging plow disk sections 2 to keep the implement moving in a direct line. This land wheel 7 is carried in a novel articulated manner, its axle shaft 8 being journalled in a frame 9 hingedly connected to the main frame 1 as by a pivot pin 10. On the outer and rearwardly extending frame member 11, in a socket 12, an upwardly hingeable latch hook 13 is mounted, being liftable at its free, outer and hooked end 13a by a control cable 14 reaching forward to the operator of the towing tractor (not shown). The hook 13 normally engages and holds the articulated land wheel frame 9 in locked or fixed position but when released as by lifting, it enables the land wheel to swing free as a trailing caster. When the cable 14 is loosed, the hook 13 can drop only to approximately horizontal position because of a depending stop 13b on its inner or pivoted end that engages the mounting socket 12. In such self-supported horizontal position, by virtue of a bevel 13c on the under side of its outer hooked end, the latch automatically relocks on the land wheel frame 9 when it is hinged or swung back into its original or fixed position.

The plow sections 2, as is common practice, are preferably mounted in rotatable relation with respect to the main beam 3 so that they may be raised clear of the ground. This is done by means of a conventional power lift clutch 15 whose interiorly serrated socket 15a is carried by a sleeve 15b terminally mounting a female ratchet socket 16 disconnectably engaged by a male ratchet part 17 on the inner end of the ground wheel shaft 8. The clutch sleeve 15b being suitably journalled in a bearing 18 on the frame part 11 aligns the female ratchet socket 16 for ready reception of the companion part 17 on the axle shaft 8 anytime the released land wheel 7 swings back relative to the implement frame to locking position. The normally non-rotating part of the power lift clutch 15 consists of a plate 15c on shaft 19 rotatably carried in the sleeve 15b and a frame-carried bushing 20 and has a crank 19a on its exposed inner end from which a linkage connection 21 reaches to the harrow gangs 2. By means of a cable 22 spring urged bell crank levers 15d are released effecting the coupling of the clutch plate 15c and its power lift crank arm 19a with the driven clutch socket 15a while the shaft 19 completes a rotative movement through approximately 180° when it is automatically disconnected and set for subsequent use. The initial coupling of the power lift clutch 15 lifts the harrow sections 2, the second time the clutch is operated drops the sections.

In the modified form shown in Figures 7, 8 and 9, the implement frame 30 is seen to include a spaced parallel pair of frame braces 30a and 30b, beyond which the L-shaped land wheel frame 31 is hinged by the frame carried pintle 32. The land wheel 33 is rotatable on a suitable bearing 34 approximately mid-way on the stem of the L-shaped frame 31 and has an internally toothed, beveled socket 35 on its inner side for reception of and releasable engagement with a cooperating bevel gear 36 on the power lift shaft 37, the disconnectible parts of which are supported by the frame braces 30a and 30b with the clutch 38 located between said spaced parallel braces. The cranked free end of the shaft 37 has a connection 39 extending to the harrow disk gangs for raising and lowering them, as in the previously described embodiment of the invention, when the clutch cable 40 is pulled.

The shorter arm 31a of the hinged land wheel frame 31, when closed, abuts the outer frame brace 30a in which position the male and female drive shaft couplings 36 and 35 are in full engagement. The wheel frame is normally locked in such operative position by a spring-urged catch 41 pivoted on the frame brace 30a and engaging a detent 42 in the wheel frame 31 near its end. This catch is released by a pull cord or cable 43 that like the clutch control cable 40 may reach forward to the implement towing tractor and be conveniently operated by the driver thereof from his driving seat. To facilitate the relocking of the hinged land wheel frame 31 the notched latching end of the frame arm 31a is bevelled as at 31b to engage and automatically swing the latch 41, that then snaps into the accommodating detent 42 as the frame reaches its normal closed or fixed position.

In use, this wide one-way plow, with the hinging land wheel frame secured in closed or locked position and drivingly connected with one part of the power lift, is trailed over the field, with the disk gangs lowered to work the soil, by a towing tractor attached to the steering draft rig. The side thrust of the diagonally disposed gangs is taken up by the steering rig set of the dirigible front furrow wheel and the fixed relation of the land wheel while its hinging frame is in locked position.

When it is desired to swing this wide implement from working position in which it is disposed substantially transversely to the line of draft into transporting or road-going position when it is trailed substantially endwise or with its major dimension more or less in line with the direction of draft, the disk gangs are raised by the tractor operator from the driving seat pulling the power lift clutch cord, then the land wheel is freed to swing as a caster by the operator, without leaving his tractor seat, pulling the latch release cord, whereupon the implement swings around to straighten out behind the tractor in relatively longitudinal transporting position being easily enabled to pass through gateways and negotiate the lanes or highways. On reentering a field to resume work, the power lift cable is pulled, freeing the clutch lock and the disk gangs fall by their own weight, then as the machine advances with the disks engaging the soil, the whole implement frame is swung crosswise to the line of draft so that the hinging land wheel frame automatically relocks to the main frame with the clutch driving shaft recoupled.

From the foregoing description taken in connection with the accompanying drawings, it will be manifest that an agricultural implement is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. An implement having a substantially wide frame having a front and a rear normally operating transversely and generally diagonally relative to the line of draft and swingable into a road-going position substantially longitudinally in line with the direction of draft, a draft hitch therefor connected to the frame at the front and adjacent one side thereof, a dirigible wheel on the front of said frame at said one side thereof connected with said hitch, a trailing castor wheel at the rear of said frame and spaced from said other wheel, a land wheel laterally spaced on said frame from said hitch and said dirigible wheel and swingable independently of said other wheels with relation to said frame, and releasable locking means mounted on said frame normally securing said land wheel against swinging; the center of inertia of said wide frame and draft hitch being so related that when said land wheel is released for swinging, the frame on being drawn forward will automatically swing from transverse into longitudinal relation to the line of draft.

2. An implement having a substantially wide frame having a front and a rear normally operable generally transversely to the line of draft and swingable into road-going position substantially in alignment with the line of draft, a draft hitch at one forward corner of said frame, a dirigible wheel on the front of said frame adjacent said corner and connected with said hitch, a castor wheel trailing from the rear of said frame, a land wheel on the front of the frame and spaced laterally from said hitch and said dirigible wheel and swingable with relation to said frame, releasable locking means on said frame operable from a distance normally securing said land wheel to said frame against swinging, and liftable side thrusting soil-engaging tools spaced across said wide frame and keeping the frame in working position as long as said tools engage the soil, the center of inertia of said wide frame and draft hitch being so related that when said land wheel is released for swinging and said soil engaging tools are raised, the frame on being drawn forward will automatically swing from transverse into longitudinal relation to the line of draft.

3. A soil working implement having a substantially wide frame having a front and a rear normally operable generally transversely to the line of draft and swingable into relatively longitudinal road-going position substantially in alignment with the line of draft, a draft hitch on one front corner of the frame, a dirigible wheel on the front of said frame adjacent to and connected with said hitch, a castor wheel trailing from the rear of said frame and laterally spaced from said dirigible wheel, a land wheel in the frame and spaced laterally from said hitch and said dirigible wheel and swingably mounted with relation to said frame on the front and at the side thereof opposite said dirigible wheel, an automatically latching means on said frame normally securing said land wheel against swinging, a remotely operable release for said latching means, side-thrusting, soil-engaging tools spaced across said wide frame and keeping the frame in working position when engaging the soil, and a lifting device for said tools connected to said swingable land wheel when said wheel is latched to said frame against swinging, said lifting device being selectable operable on the rotation of said land wheel; the center of inertia of said wide frame and said draft hitch being so related that when said soil-engaging tools are raised and said swingable land wheel is subsequently unlatched, the frame on being drawn forward will automatically swing from transverse into longitudinal relation to the line of draft and then later when said soil-engaging tools are dropped the frame will automatically swing again into normal transverse operating position and said land wheel will return to fixed and automatically relatched relation to said frame and operable connection with said lifting device.

4. An agricultural implement including soil working tools movable into and out of working position having a substantially wide frame having a front and a rear and with a normal soil-working position substantially transversely of the line of draft, a dirigible draft hitch wheel at the front of the frame and on one side thereof, an articulated but normally fixed land wheel on the opposite side of the front of said implement frame resisting side thrust of the tools when in working position, means moving said tools out of working position for interrupting the thrust of the tools, means on said frame for freeing said land wheel and allowing it to hinge with respect to the frame when the thrust of the tools has been interrupted and thus permitting the wide frame to automatically swing longitudinally of the line of draft, and frame-carried automatically relocking means for said articulated land wheel operable when the frame swings transversely of the line of draft and the land wheel swings into its normally fixed position subsequent to the reestablishment of the thrust of the tools.

5 An agricultural implement as claimed in claim 4 wherein the working tools comprise liftable soil-working elements on said frame, said elements when dropped into normal soil-engaging position operating to swing the frame from trailing longitudinal into normal working transverse position and said articulated land wheel to swing into normal fixed position and engagement by said automatically relocking means.

6. An agricultural implement as claimed in claim 4 wherein the working tools comprise soil-working elements mounted on said frame, lifting and holding means therefor mounted on said frame and a driving means for said lifting means connectible by a separable coupling with said articulated land wheel whereby said elements are liftable only when said land wheel is in fixed position but releasable whether said wheel is fixed or freed to cause said elements to fall to soil engaging position, in which position said elements operate to swing said frame from longitudinal into transverse position and relock said articulated wheel.

7. An agricultural implement having a relatively wide frame having a front and a rear with a normal soil-working position substantially transversely of the line of draft, a steerable draft hitch mounted on the front thereof at one side, a dirigible wheel on said frame connected with and controlled by said hitch, a yoke pivoted to said frame on the side of the front opposite from said draft hitch and swingable horizontally with respect to said frame, a releasable latch on said frame normally engaging said swingable yoke and holding the same in fixed relation to the frame, a land wheel, a rotatable axle shaft on said land wheel journalled in said yoke, a remotely operable control cable connected to said latch for releasing the same, a castor wheel trailing from the rear of said frame, a section of soil-engaging tools carried by said frame in rotatable liftable relation thereto, and lifting mechanism for said section mounted on said frame and disconnectably engageable with the axle shaft of said yoke carried land wheel; whereby said frame, when the section of soil-engaging tools is raised and the pivoted yoke unlatched allowing the land wheel to swing, may automatically swing into a road-going position longitudinally of the line of draft.

References Cited in the file of this patent

UNITED STATES PATENTS

| Number | Name | Date |
|---|---|---|
| 190,460 | Wilson | May 8, 1877 |
| 650,922 | Wilbur | June 5, 1900 |
| 825,145 | Melvin | July 3, 1906 |
| 1,243,560 | Shaffer | Oct. 16, 1917 |
| 1,780,955 | Toth | Nov. 11, 1930 |
| 2,554,741 | Johnston | May 29, 1951 |